United States Patent
Björkner

(10) Patent No.: US 7,580,969 B2
(45) Date of Patent: Aug. 25, 2009

(54) METHOD AND SYSTEM FOR INFORMATION DISTRIBUTION

(75) Inventor: Jörgen Björkner, Hägersten (SE)

(73) Assignee: Oracle International Corporation, Redwood Shores, CA (US)

( * ) Notice: Subject to any disclaimer, the term of this patent is extended or adjusted under 35 U.S.C. 154(b) by 782 days.

(21) Appl. No.: 10/380,074

(22) PCT Filed: Aug. 31, 2001

(86) PCT No.: PCT/SE01/01845

§ 371 (c)(1),
(2), (4) Date: Oct. 6, 2003

(87) PCT Pub. No.: WO02/23786

PCT Pub. Date: Mar. 21, 2002

(65) Prior Publication Data

US 2004/0049584 A1     Mar. 11, 2004

(51) Int. Cl.
    *G06F 15/16*     (2006.01)
(52) U.S. Cl. .................. 709/201; 709/203; 709/217; 705/26
(58) Field of Classification Search ........... 709/201, 709/203, 217–219, 227–228; 705/26
See application file for complete search history.

(56) References Cited

U.S. PATENT DOCUMENTS

| | | | |
|---|---|---|---|
| 6,460,072 B1 * | 10/2002 | Arnold et al. | 709/217 |
| 6,615,184 B1 * | 9/2003 | Hicks | 705/26 |
| 6,757,710 B2 * | 6/2004 | Reed | 709/217 |
| 6,862,612 B1 * | 3/2005 | Horn et al. | 709/219 |
| 6,983,276 B2 * | 1/2006 | Tenorio | 707/7 |
| 2002/0055889 A1 * | 5/2002 | Nakagawa | 705/27 |
| 2002/0069116 A1 * | 6/2002 | Ohashi et al. | 705/26 |
| 2002/0069244 A1 * | 6/2002 | Blair et al. | 709/203 |
| 2002/0091519 A1 * | 7/2002 | Lewis et al. | 704/235 |
| 2002/0091562 A1 * | 7/2002 | Siegel et al. | 705/10 |
| 2002/0120519 A1 * | 8/2002 | Martin et al. | 705/21 |
| 2002/0188517 A1 * | 12/2002 | Banerjee et al. | 705/26 |

FOREIGN PATENT DOCUMENTS

| | | | |
|---|---|---|---|
| WO | WO 00/51050 | * | 8/2000 |
| WO | WO 00/52608 | | 9/2000 |

* cited by examiner

*Primary Examiner*—Philip B Tran
(74) *Attorney, Agent, or Firm*—Hanify & King, P.C.

(57) ABSTRACT

A system and a method for distributing information from at least one Information Provider to at least one Customer device. According to the invention, the method comprises the steps of: sending information from at least one of the Information Providers to an Information Publisher; comparing the content of the information with information about the customers stored in customer profiles in the Information Publisher; distributing the information to all the customers corresponding to a certain feature described in the customer profile; receiving and processing the information in at least one Information Receiver in each concerned Customer device; and notifying the customer by displaying at least a part of the information on the Customer device.

25 Claims, 3 Drawing Sheets

METHOD AND SYSTEM FOR INFORMATION DISTRIBUTION

BACKGROUND OF THE INVENTION

The present invention relates to a method for distributing information from at least one Information Provider to at least one Customer device.

It also relates to a system for distributing information from at least one Information Provider to at least one Customer device.

Furthermore it relates to a Customer device and an Access Service Provider.

RELATED ART

Methods for distributing information of the kind mentioned above exist today. One example is display of commercial information to Internet customers when they are browsing the web during the loading of web pages.

A problem with these existing methods is that they are limited to only distribute the information when the customer is using a particular application, for example web browsing.

Another problem is that it is not possible to make a selection among the customers in the distribution.

A further problem is that the information providers can not check that the information has been displayed correctly to the customer.

SUMMARY

An object of the present invention is to improve the interplay between information providers and customers and also between different customers as to distribution formation. It is also an object of the invention to provide a method and a system for distributing information to customer devices and presenting the information to the customers effectively.

This is achieved by a method of the initially defined kind comprising the steps of:
  sending information from at least one of the Information Providers to an Information Publisher;
  comparing the content of the information with information about the customers stored in customer profiles in the Information Publisher;
  distributing the information to all the customers corresponding to a certain feature described in the customer profile;
  receiving and processing the information in at least one Information Receiver in each concerned Customer device;
  notifying the customer by displaying at least a part of the information on the Customer device.

It is also achieved by a system of the initially defined kind characterised in that it comprises:
  an Information Publisher connected to the at least one Information Provider and adapted to distribute information received from the Information Providers according to information about the customers stored in customer profiles in the Information Publisher;
  an Information Receiver located in each Customer device adapted to receive and process the information received from the Information Publisher;
  an Information Presenter connected to the Information Receiver in each Customer device adapted to notify the customer by displaying at least a part of the information on the Customer device.

It is also achieved by a Customer device comprising such an Information Receiver and Information Presenter and an Access Service Provider comprising such an Information Publisher.

With this method, system, Customer device and Access Service Provider information can be delivered to the customers according to their desires or according to other information about the customers such as their location and the information can be displayed to the customers right away.

Preferably the method further comprises the steps of:
  establishing the connection between a Customer device and the network through a first interface;
  informing the Information Publisher through a second interface that is separated from the first interface that this specific Customer device is connected to the network.

This second interface is preferably a higher level of the first interface and thus just a logical connection.

Suitably the distribution of information to the customers is done through the second interface. Hereby the information could be displayed to the customer regardless of what kind of application he is using for the moment.

Preferably the distribution of information is dependent on the customers' desires and/or location.

Suitably at least one address of each Customer device is placed in at least one specific list depending on what kind of information the customer should be notified with.

The customer could be notified by only displaying a notice telling that information has been received.

Either could the information be displayed to the customer for a predetermined time period or until the customer confirms the receiving by for example clicking on the information.

Preferably the information that should be distributed to a certain customer is queued in the Information Publisher if the customer not is logged on for the moment and distributing the information to the customer as soon as he logs on.

Suitably the Information Receiver checks if the information is correctly displayed in the Customer device and sends a fault message to the Information Publisher if the information was incorrectly displayed and/or a success message if the information was correctly displayed.

Preferably a Network Access Server is instructed from the Information Publisher to disconnect the Customer device if a fault message was received in the Information Publisher and/or rewarding the customer if a success message was received.

Suitably the method also comprises the steps of:
  sending instructions to the Information Publisher from a Customer device telling that a specific information should be distributed to for example the customer's friends or colleagues;
  distributing this information to other Customer devices according to the instructions from the customer, this distribution of information being done in the same way as the distribution of information from the Information Providers.

Advantageously SIP (=Session Initiation Protocol) is used as the transport protocol.

DETAILED DESCRIPTION OF EMBODIMENTS

Figure 1:
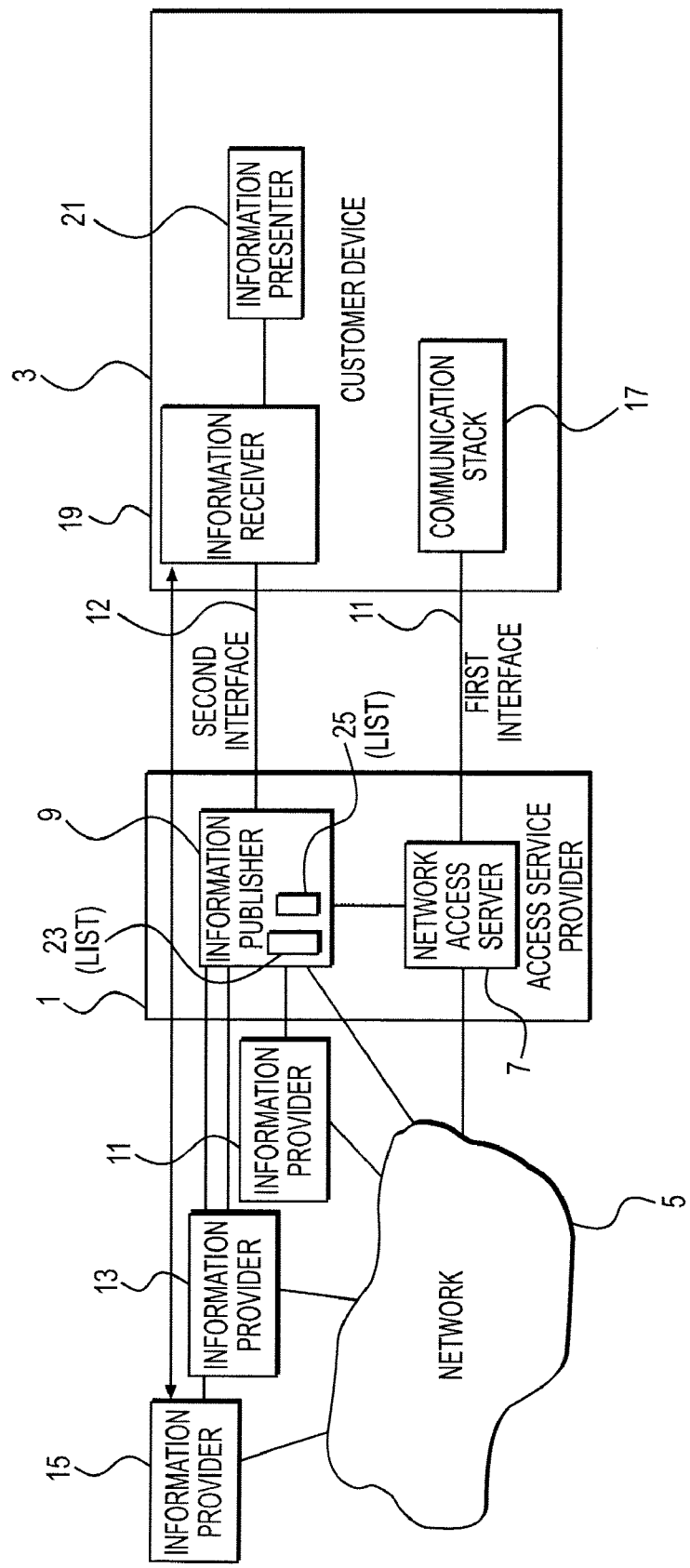
FIG. 1 is a schematic view of an Access Service Provider communicating with a Customer device and providing information to the customer according to a first embodiment of the invention.

FIG. 1 is a schematic view of an Access Service Provider 1 communicating with a Customer device 3 and providing information to the customer according to a first embodiment of the invention. The Access Service Provider 1 provides the customer with a connection to a backbone network 5. The Access Service Provider 1 comprises a Network Access Server 7 connected to the network 5 and an Information Publisher 9 connected to the network 5 and to the Network Access Server 7. A number of Information Providers 11,13, 15 are connected to the Information Publisher 9 and to the network 5.

The Customer device 3 comprises a Communication Stack 17, which is connectable to the Network Access Server 7 through a first interface I1. It comprises also an Information Receiver 19 connectable to the Information Publisher 9 in the Access Service Provider 1 through a second interface I2. This second interface I2 could be a higher level of the first interface I1 and is thus just a logical connection. Furthermore the Information Receiver 19 is connected to an Information Presenter 21 in the Customer device 3. The Information Presenter 21 is adapted to notify the customer by displaying the information received in the Information Receiver 19 in the Customer device. The displaying of the information in the Customer device 3 requires no interaction with the Communication Stack 17. This reduces the risk for manipulation by not trusted customers.

The Information Receiver 19 and the Information Presenter 21 could be provided in the same unit in the Customer device 3, and the Information Providers 11,13,15 could be provided in the same unit as the Information Publisher 9 in the Access Service Provider 1. The connection between the Information Publisher 9 and the Network Access Server 7 is an interface, here called the third interface I3.

When a customer who is using the Customer device 3 logs on to the network through the first interface I1 the Information Receiver 19 informs the Information Publisher 9 through the second interface I2 that this specific customer is logged on. The Information Publisher 9 comprises information about the customers who are joining this information service. The information about the customers could for example be information about what kind of information they are interested in receiving or if they are customers who receive free internet access in exchange to accepting commercial information. It could also be other kinds of information about the customers such as their age and their location. All the information about the different customers could be stored in a customer profile in the Information Publisher 9. Then the information could be distributed according to the information in the profiles. The Information Publisher 9 comprises in one embodiment of the invention lists 23,25 comprising the addresses to customers that should be provided with the same information. Here only two lists 23,25 are shown, but there could of course be many more lists present. The customers who want to join the information service must first inform the Information Publisher 9 about for example what kind of information they want to receive. Each list comprises for example all the customers wanting a specific type of information or all the customers who should receive commercials to get free Internet.

Another possibility with this system is that the customers themselves can initiate information to be sent to friends or colleagues. In this case the Information Publisher 9 also comprises, or can load down from the customers, another type of lists comprising the different customers' addresses to for example friends and colleagues.

The benefits of the method and system according to the invention will be even greater if SIP (=Session Initiation Protocol) is used as the transport protocol between the service provider, the information providers and the customers. When SIP is used the customer can be reached with the information he wants to have even if he is not sitting by his computer. The information could for example be transformed to show up on his mobile telephone. When the customer turns on his mobile terminal the Information Receiver 19 informs the Information Publisher 9 that this customer is connected and which address and type of terminal he is connected to.

A new customer who is interested in receiving a certain type of information needs to inform the Information Publisher 9 about what type of information he is interested in receiving. Different customers wanting the same type of information form a group of customers. The Information Publisher keeps lists 23,25 of all these groups. The Information Providers 11,13,15 then just send the information to the Information Publisher that distributes the information to the customers in the list for this specific information. The Information Receiver in each of these Customer devices receives the information and processes it. Then the information is displayed to the customers. If there are customers in this specific list that not are logged on the information could be queued in the Information Publisher 9 to be sent to the customer as soon as he logs on. In a second embodiment of the invention only a notice about that information has been received and could be displayed is displayed to the customer right away. Then the customer is able to choose if he wants to read the information now or later. There are also other different possibilities of how to display the information to the customer. The displayed information could either disappear from the display after a certain time period or needs to be clicked on to disappear. The latter could be preferred if a confirmation that the information has been displayed to the customer is needed.

Another possible embodiment of the invention is that the Information Publisher 9 informs the Information Providers 11,13,15 about the customer profiles and that the Information Providers 11,13,15 themselves distribute the information to the customers.

Figure 2:
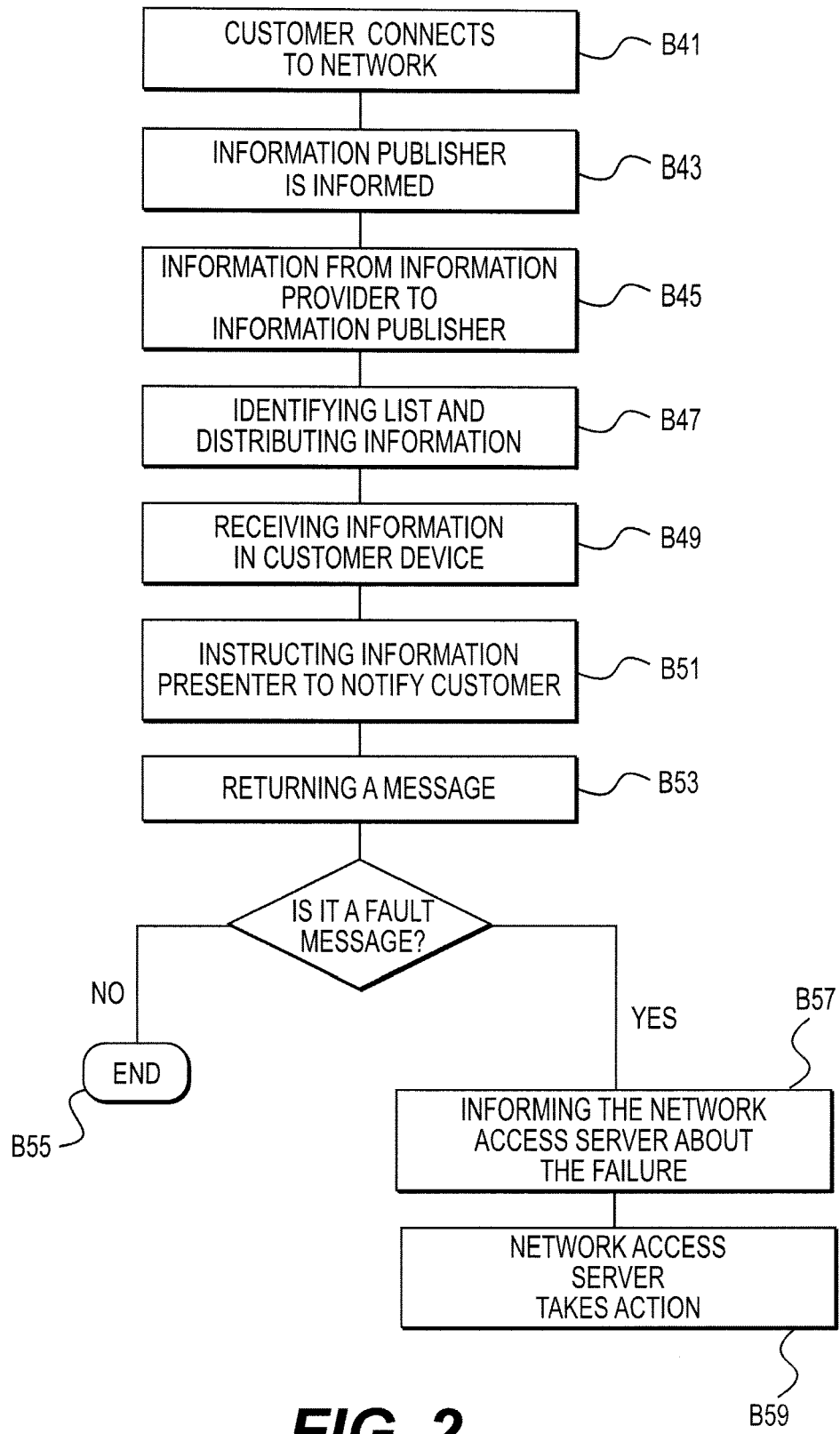
FIG. 2 is a flow chart showing the process for distribution of information according to a first embodiment of the invention.

FIG. 2 is a flow chart showing the process for distribution of information according to a first embodiment of the invention. The components that are mentioned in this description of the process are all shown in FIG. 1.

The process starts in block B41 where a customer comprised in one of the lists 23,25 connects to the network. Thus the Communication Stack 17 is connecting to the Network Access Server 7 through the first interface I1. In block B43 the Information Receiver 19 informs the Information Publisher 9 through the second interface I2 that this specific customer now is logged on. The Information Publisher 9 marks that the customer now is logged on in his lists 23,25. In block B45 one of the Information Providers 11 has new information to deliver. It transfers this information to the Information Publisher 9. In block B47 the Information Publisher 9 identifies the list comprising the addresses of customers wanting this specific information and delivers the information to the Information Receivers 19 in each concerned Customer device 3 through the second interface I2. In block B49 the information is received and processed in the Information Receivers 19, and in block B51 the Information Receivers 19 instruct the Information Presenters 21 to notify the customers with the information and the information is displayed to the customers.

In block B53 the Information Receivers 19 check if the information has been correctly displayed and return a success message or a fault message to the Information Publisher 9 telling whether the information was displayed correctly to the customer or not. If the information was displayed correctly in the Customer device the process ends in block B55. In another embodiment of the invention the customer is rewarded in some way when the information has been displayed.

If, on the other hand, the information not could be displayed the process continues in block B57 where the Information Publisher 9 informs the Network Access Server 7 about the failure. In block B59 the Network Access Server 7 takes action. For example the customer could be disconnected if the situation is that the customer is obligated to for example receive commercials in exchange for free Internet.

These last steps where a message is sent from the Information Receiver 19 to the Information Publisher 9 telling if the information was displayed or not are not necessary for the invention.

Figure 3:
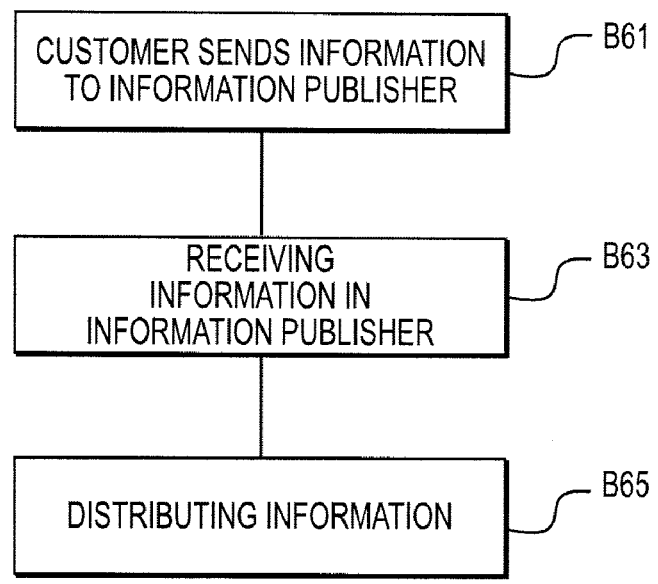
FIG. 3 is a flow chart showing the process for distribution of information initiated from a customer according to the invention.

FIG. 3 shows a process according to one embodiment of the invention. This process is complementary to the process described in FIG. 2. The first embodiment described in FIG. 2 could thus be extended to comprise also this feature described below. Here the sending of information is initiated from the customer. It could for example be information that has been received by the customer and that he wants to forward to all his colleagues. Otherwise it could be information that has been produced in the Customer device 3.

In block B61 a customer sends a message to the Information Publisher 9 containing the information he has received and that he wants to forward to for example his friends or colleagues. The message comprises also addresses to the customers he wants to forward the information to. In block B63 the message is received in the Information Publisher 9 and in block B65 the information is distributed to the other customers. This distribution is done in the same way as the distribution of information from the Information Providers 11,13,15.

The invention claimed is:

1. A method for distributing information from at least one Information Provider to at least one Customer device comprising the steps of:
   sending information from at least one of the Information Providers to an Information Publisher;
   comparing the content of the information with information about the customers stored in customer profiles in the Information Publisher;
   establishing a connection between a Customer device and a network through a first interface of the Customer device;
   informing the Information Publisher through a second interface of the Customer device that is separated from the first interface of the Customer device that this specific Customer device is connected to the network;
   distributing the information to all the customers corresponding to a certain feature described in the customer profile, including the Customer device that is connected to the network;
   receiving and processing the information in at least one Information Receiver in each concerned Customer device;
   notifying the customer by displaying at least a part of the information on the Customer device.

2. The method according to claim 1, wherein the distribution of information to the customers is done through the second interface.

3. The method according to claim 1, wherein the distribution of information is dependent on the customers' desires and/or location.

4. The method according to claim 1, further comprising placing at least one address of each Customer device in at least one specific list depending on what kind of information the customer should be notified with.

5. The method according to claim 1, further comprising notifying the customer by only displaying a notice telling that information has been received.

6. The method according to claim 1, further comprising displaying the information to the customer for a predetermined time period or until the customer confirms the receiving by for example clicking on the information.

7. The method according to claim 1, further comprising queuing the information that should be distributed to a certain customer in the Information Publisher if the customer is not currently logged on and distributing the information to the customer as soon as he logs on.

8. The method according to claim 1, further comprising checking from the Information Receiver if the information is correctly displayed in the Customer device and sending a fault message to the Information Publisher if the information was incorrectly displayed and/or a success message if the information was correctly displayed.

9. The method according to claim 8, further comprising instructing a Network Access Server from the Information Publisher to disconnect the Customer device if a fault message was received in the Information Publisher and/or rewarding the customer if a success message was received.

10. The method according to claim 1, further comprising the steps of:
    sending instructions to the Information Publisher from a Customer device telling that a specific information should be distributed to for example the customer's friends or colleagues;
    distributing this information to other Customer devices according to the instructions from the customer, this distribution of information being done in the same way as the distribution of information from the Information Providers.

11. The method according to claim 1, wherein Session Initiation Protocol is used as the transport protocol.

12. A system for distributing information from at least one Information Provider to at least one Customer device, comprising:
    an Information Publisher connected to the at least one Information Provider and adapted to distribute information received from the Information Providers according to information about the customers stored in customer profiles in the Information Publisher;
    a Communication Stack in each Customer device that is connectable to a Network Access Server through a first interface of the Customer device;
    an Information Receiver located in each Customer device adapted to receive and process the information received from the Information Publisher and adapted to inform the Information Publisher through a second interface of the Customer device that this customer device is connected to the network;
    an Information Presenter connected to the Information Receiver in each Customer device adapted to notify the customer by displaying at least a part of the information on the Customer device.

13. The system according to claim 12, wherein the Information Publisher is adapted to distribute the information to the customers through the second interface that is separated from the first interface.

14. The system according to claim 12, wherein the Information Publisher is adapted to distribute the information to the customers depending on the customers' desires and/or location.

15. The system according to claim 12, wherein said second interface is a higher level of the first interface.

16. The system according to claim 12, further comprising lists placed in the Information Publisher, each list comprising addresses to customers wanting the same type of information.

17. The system according to claim 12, wherein the Information Presenter is adapted to only display a notice telling that information has been received when the customer is notified.

18. The system according to claim 12, wherein the Information Presenter is adapted to display the information to the customer for a predetermined time period or until the customer confirms the receiving by for example clicking on the information.

19. The system according to claim 12, wherein the Information Publisher is adapted to queue the information that should be distributed to a certain customer if the customer is not currently logged on and distribute the information to the customer as soon as he logs on.

20. The system according to claim 12, wherein the Information Receiver is adapted to check if the information is correctly displayed in the Customer device and send a fault message to the Information Publisher if the information was incorrectly displayed and/or a success message if the information was correctly displayed.

21. The system according to claim 20, wherein the Information Publisher is adapted to instruct the Network Access Server to disconnect the Customer device if a fault message was received and/or to reward the customer if a success message was received.

22. The system according to claim 12, wherein the Information Receiver is adapted to send instructions to the Information Publisher telling that a specific information should be distributed to for example the customer's friends or colleagues and in that the Information Publisher is adapted to distribute this information to other Customer devices according to the instructions from the customer, this distribution of information being done in the same way as the distribution of information from the Information Providers.

23. The system according to claim 12, wherein the Session Initiation Protocol is used as the transport protocol.

24. A Customer device, comprising an Information Receiver and an Information Presenter according to claim 12.

25. An Access Service Provider, comprising an Information Publisher according to claim 12.

* * * * *

UNITED STATES PATENT AND TRADEMARK OFFICE
CERTIFICATE OF CORRECTION

PATENT NO. : 7,580,969 B2  Page 1 of 1
APPLICATION NO. : 10/380074
DATED : August 25, 2009
INVENTOR(S) : Jorgen Bjorkner It is certified that error appears in the above-identified patent and that said Letters Patent is hereby corrected as shown below:

In column 1, line 34, delete "distribution formation" and insert -- the distribution of information --, therefor.

Signed and Sealed this

Twenty-ninth Day of June, 2010

David J. Kappos
*Director of the United States Patent and Trademark Office*